US005538551A

United States Patent [19]
Desbiens

[11] Patent Number: 5,538,551
[45] Date of Patent: Jul. 23, 1996

[54] MODELLING COMPOSITION AND PREPARATION PROCESS

[75] Inventor: Micheline Desbiens, Montréal, Canada

[73] Assignee: Jouets Bo-Jeux Toys Inc., Anjou, Canada

[21] Appl. No.: 440,881

[22] Filed: May 15, 1995

Related U.S. Application Data

[63] Continuation of Ser. No. 10,402, Jan. 28, 1993, abandoned.

[30] Foreign Application Priority Data

Aug. 18, 1992 [CA] Canada ................................. 2076328

[51] Int. Cl.⁶ .............................. C08L 39/00; C08H 1/00
[52] U.S. Cl. ................................... 106/128.1; 106/132.2; 106/134.1
[58] Field of Search .................................. 106/130, 157, 106/159.1

[56] References Cited

U.S. PATENT DOCUMENTS

| | | | |
|---|---|---|---|
| 2,269,509 | 1/1942 | Batelja | 106/150 |
| 2,482,986 | 9/1949 | McClatchev et al. | 106/214 |
| 3,167,440 | 1/1965 | McVicker et al. | 106/150 |
| 3,183,108 | 5/1965 | Rhodenbaugh et al. | 106/153 |
| 3,804,654 | 4/1974 | Liu | 106/134 |
| 4,172,054 | 10/1979 | Ogawa et al. | 524/18 |
| 4,386,964 | 6/1983 | Herbert | 106/150 |
| 4,956,404 | 9/1990 | Pelzig | 524/48 |

FOREIGN PATENT DOCUMENTS

| | | | |
|---|---|---|---|
| 620733 | 5/1961 | Canada . | |
| 49-572 | 12/1974 | Japan | 106/157 |

*Primary Examiner*—Melissa Bonner
*Attorney, Agent, or Firm*—Bell, Seltzer, Park & Gibson

[57] ABSTRACT

The invention related to a modelling composition, characterized in that it results from the cooking of a mixture comprising: grain flour, water and salt; a thickening agent comprising a mixture of a product (comprising 80% of gluten and 20% of grain flour), cornstarch and cream of tartar in a volumetric ratio of about 2:1:1; a food grade anti-mold agent; a food grade liquid silicone based anti-sticking agent; and a lanoline based humididifying agent; said ingredients being mixed together before said cooking, and the cooling and the kneading of the dough obtained. This modelling composition shows the advantage of being not-toxic, non-sticking, of not drying too quickly and of being of low frosting and of re-humidifiable when dried. The invention also relates to a process for the preparation of such a composition.

7 Claims, No Drawings

MODELLING COMPOSITION AND PREPARATION PROCESS

This application is a continuation of application Ser. No. 08/010,402 filed Jan. 28, 1993, now abandoned.

The present invention relates to a modelling composition that shows the advantage of being non-toxic, non-sticking, of not drying to quickly, of being low frosting and being re-humidifiable when dried. Furthermore, this composition is long lasting, malleable, does not crumble and does not stain. The invention also relates to a process for the preparation of such a composition.

More particularly, the invention relates to the use of a particular selection of thickening, anti-sticking and humidifying agents that allows to confer to a grain flour, water and salt based modelling composition, such characteristics that it is non-sticking, it is low frosting and has a particularly slow drying period. Furthermore, this modelling composition once dried, may be re-humidified by putting it in the presence of water during a period of time varying from a few hours to a few days to thus allow it to recover its original characteristics.

U.S. Pat. Nos. 2,269,509, 2,482,986, 3,167,440, 3,183,108, 4,172,054 and 4,386,964 all describe grain flour, water and salt based modelling compositions. More particularly, U.S. Pat. Nos. 2,482,986, 3,167,440, 3,183,108, 4,172,054 and 4,386,964 all describe compositions further comprising a thickening agent and in particular U.S. Pat. No. 4,386,964 is directed toward a composition further comprising a thickening agent and a humidifying agent. However, in this latter case the essence of the invention disclosed lies in a powder allowing to prepare if necessary a modelling composition by adding water to this latter and by heating the mixture obtained during 1 to 4 minutes at a temperature of 40° C. to 60° C. The fact that we must prepare the modelling composition as and when we need it reveals that it is not re-usable once dried.

However, each above mentioned patents does not allow to embody a grain flour, water and salt based modelling composition that has the advantage of being non-toxic, non-sticking, of not drying to quickly and of being re-humidifiable once dried to thus allow it to recover its original characteristics.

Therefore, an important need exists to embody a modelling composition namely a modelling composition which only comprises ingredients that are acceptable from a foodstuff point of view, that has the advantage of being long-lasting, malleable, of not crumbling, of being non-sticking, of being low frosting and of not drying up too quickly, to thus allow and easy use of the modelling composition by children, to avoid any risks of intoxications if a very young child eats some modelling composition, to avoid inconveniences that are generally associated with prior art modelling compositions (stains, etc . . . ). Furthermore, this modelling composition has the advantage of being re-humidifiable once dried, to thus give it again its original characteristics.

More particularly, the present invention relates to a modelling composition characterised in that it results from the cooking of a mixture comprising:

grain flour, water and salt;

at least one thickening agent consisting of a mixture of a product (comprising 80% of gluten and 20% of gain flour), cornstarch and cream of tartar in a volumetric ratio of about 2:1:1;

a food grade anti-mould agent;

a food grade liquid silicone based anti-sticking agent; and lanoline as humidifying agent;

said ingredients being mixed together before said cooking; and the cooling and the kneading of the dough obtained.

Advantageously, when the modelling composition becomes or is dried to such a point that it is no longer usable, it is possible to re-humidify it to give it again its original characteristics. To do so, it is sufficient to put the dried modelling composition in the presence of water, more particularly to put the modelling composition under a flow of tap water for a few minutes and then to put it in a container at the room temperature for a period of time varying, according to the amount of modelling composition to be re-humidified, from a few hours to one day, and then to do again the above steps until the modelling composition recovers its original characteristics. For example, we may preferably put the dried modelling composition after having pass it under a flow of tap water, in a sealed container, namely a container the type commonly used to freeze food.

The invention also related to a process for the preparation of a modelling composition as defined hereinbefore. This process is characterized in that;

i) we realise a mixture comprising:

grain flour, water and salt;

at least one thickening agent consisting of a mixture of a product (comprising 80% of gluten and 20% of grain flour), cornstarch and cream of tartar in a volumetric ratio of about 2:1:1;

a food grade anti-mould agent;

a food grade liquid silicone based anti-sticking agent; and a lanoline as humidifying agent;

ii) we cook the mixture obtained from step i);

iii) we allow the resulting dough obtained from step ii) to cool;

iv) We knead the dough obtained from step iii).

Advantageously, the ingredients are first gathered in a first and a second pre-mixes, the first pre-mix comprising all dry ingredients, the second pre-mix comprising all the ingredients not contained in the first pre-mix, both pre-mixes being then joined together to form the mixture intended to be then submitted to the cooking.

Preferably, the invention related to a composition characterized in that the mixture to be cooked comprises:

from 0.5 to 1.75 cup of grain flour, from 0.33 to 0.75 cup of fine granules of common salt (i.e. table salt) and from 0.5 to 1.5 cup of water;

a thickening agent comprising from 2 tablespoons to 0.75 cup of a product (comprising 80% of gluten and 20% of grain flour), from 1 teaspoon to 0.5 cup of cream of tartar and from 1 teaspoon to 0.5 cup of cornstarch, the product, the cream of tartar and the cornstarch being in a volumetric ratio of about 2:1:1;

a food grade anti-moulding agent, preferably 0.25 teaspoon of sodium benzoate;

from 0.125 to 1 tablespoon of food grade liquid silicone based anti-sticking agent, (for example, a dimethylpolysiloxane);

from 0.125 to 2 tablespoons of lanoline as humidifying agent.

Advantageously, the food graded liquid silicone based anti-sticking agent is a product known under the trademark SILICONE-426R (Rhône-Poulenc) or, preferably a product known under the trademark SILICONE-200 FLUIDE 350 CS FOOD (Dow Corning Company).

Advantageously, the lanoline based humidifying agent is lanoline and, preferably this latter may further define a thickening agent. The thickening agent may further contribute to make easier an homogeneous dispersion of the various constituents of the modelling composition. Preferably, lanoline may be the one sold under the trademark AMERCHOL AAA.

Advantageously, the product (comprising 80% of gluten and 20% of grain flour) may be a commercial product sold under the trademark OGILVY.

Advantageously, the water used may be ordinary water, that is tap water coming from a city aqueduct system.

Advantageously, the grain flour may be the one sold under the trademark CSP Foods (Great Plains, Farine du Boulanger, Saskatoo, Saskatchewan, CANADA).

It is to be noted that time cream of tartar, the sodium benzoate and liquid silicone are well known food grade additives. The lanoline which is frequently used in the field of cosmetology because being rapidly absorbed through the skin, is not known to the knowledge of the Applicant to be toxic to a human even when ingested in substantial but non exaggerated amounts.

According to a particularly preferred embodiment the invention relates to a composition characterized in that the mixture to be cooked comprises:

1 cup of grain flour, 0.25 cup of fine granules of common salt and 1 cup of water (preferably tap water);

at least one thickening agent consisting of 0.25 cup of a product (comprising 80% of gluten and 20% of grain flour), 2 tablespoons of cream of tartar and 2 tablespoons of cornstarch;

0.25 teaspoon of sodium benzoate as anti-mould agent;

0.5 teaspoon of an anti-sticking agent selected from the group consisting of products known under the trademarks SILICONE-426R (Rhône-Poulenc) and SILICONE-200 FLUIDE (Down Corning Company);

1 teaspoon of lanoline as humidifying agent.

Preferably, the invention relates to a composition characterised in that the mixture further contains one or several usual additives for modelling composition, and namely one or several additives selected from the group consisting of dyes and perfumes. As perfumes we may for example use one or several essential oils known to be food grade. As dyes we may for example use one or several dyes known to be food graded.

Advantageously, we cook the mixture obtained from step i) at the appropriate temperature to make the mixture swelling, for example from 110° to 150° F. and preferably about 135° F., for a few minutes and preferably from 2 to 4 minutes. Preferably, the cooking may be made in a reactor comprising an heating mantel, for example in a "bain-marie".

The present invention will be better understood with reference to the following description of an experimental part of the disclosure showing advantages of the invention making the object of the present patent application.

In the following examples, the following abbreviations were used:
c=cup (≈8 fluid ounces)
tab. s.=tablespoon (≈0.5 fluid once)
the s.=teaspoon (≈⅙ fluid once )
q.s.=sufficient amount
grain flour=sold under the trademark CPS Foods (Great Plains, Farine du Boulanger, Saskato, Saskatchewan, CANADA)
salt=table salt under the form of fine granules
gluten=gluten sold under the trademark OGILVY and consisting of a mixture of 80% of gluten and 20% of grain flour;
silicone=foodgrade liquid silicone sold under the trademark FLUIDE 200 by the Dow Corning Company and having a viscosity of 350 CS;
lanoline=lanoline sold under the trade mark AMERCHOL AAA.

EXAMPLES FOR PREPARING A MODELLING COMPOSITION

Example 1 (Invention)

Ingredients:
1 c. of grain flour
¼ c. of salt
¼ c. of gluten
2 tab.s. of cream of tartar
2 tab.s. of cornstarch
¼ the s. of sodium benzoate
1 c. of water
½ the s. of silicone
1 the s. of lanoline
q.s. of essential oils (GIVAnDAN) and
q.s. of dyes (DYECO LTD)

First of all, we form two pre-mixes that is, a first one consisting of pre-mix of all dry ingredients of the recipe that is: grain flour, salt, gluten, cornstarch, cream of tartar and sodium benzoate; a second pre-mix consisting in a mixture of water, liquid silicone, lanoline, essential oils and dyes. Then we mix each pre-mixes in a high-speed mixer to embody the dough. We then recover the dough and we cook it during about 2 to 4 minutes at a temperature of about 135° F. in a "bain-marie" to allow it to swell, then we knead the dough obtained during a few minutes and we obtain a modelling composition ready to be used. This modelling composition has the advantage of being non-sticking, of being low frosting even after fifteen days of use, and of drying slowly.

Furthermore, when the surrounding air humidity is high, the drying time is still more extended.

Finally, if it happens that after a few weeks of use the modelling composition is dried or show drying signs, it will be enough to simply put it under tap water for a few minutes and to put it in a sealed container at room temperature and during a period comprise between a few hours and one day and then redo the above process as many times as necessary (e.g. few times) to give it its original characteristics.

For example, a piece of modelling composition obtained hereinabove and having a volume of about 4 ounces was dried up until its becomes hard and non-malleable masse. This piece of modelling composition has been put under tap water for 1 to 2 minutes and-then put in a sealed box for 1 to 2 hours, at room temperature. This process was repeated eight times. When the modelling composition became malleable, it has been further kneaded when pass under the tap water. After the eighth time, the modelling composition had recovered its original characteristics.

In order to illustrate that the invention lies in the particular selection of ingredients defining the thickening agent which are the gluten, the cornstarch and the cream of tartar, of the non-sticking agent which is liquid silicone and of the humidifying agent, which is lanoline, the Applicant has embodied the following comparative examples with the same process than the one used to embody the modelling composition according to the invention.

Example 2

Ingredients:
1 c. of flour

¼ c. of salt
¼ c. of gluten
¼ the s. of sodium benzoate
1 c. of water
½ the s. of lanoline
1 the s. of silicone and
q.s. of essential oils (GIVAUDAN).

The modelling composition showed a soft and sticky texture.

Example 3

Ingredients:
1 c. of grain flour
¼ c. of salt
¼ c. of gluten
2 tab.s. of cream of tartar
¼ the s. of sodium benzoate
1 c. of water
½ the s. of silicone and
1 the s. of lanoline.

The modelling composition obtained had a soft and sticky texture.

Example 4

Ingredients:
1 c. of flour
¼ c. of salt
¼ c. of gluten
2 tab.s. of cornstarch
¼ the s. of sodium benzoate
1 c. of water
½ the s. of silicone and
1 the s. of lanoline.

The modelling composition obtained had a soft and sticky texture.

Example 5

Ingredients:
1 c. of flour
¼ c. of salt
½ c. of gluten
2 tab. s. of cream of tartar
2 tab.s. of cornstarch
¼ the s. of sodium benzoate
1 c. of water
½ the s. of silicone and
1 the s. of lanoline.

The modelling composition obtained showed a texture that was hard, dried-up rapidly and crumbled.

Example 6

Ingredients:
1 c. of flour
¼ c. of salt
¼ c. of gluten
4 tab.s. of cornstarch
2 tab. s. of cream of tartar
¼ the s. of sodium benzoate
1 c. of water
½ the s. of silicone and
1 the s. of lanoline.

The modelling composition shows a texture that was hard, dried-up rapidly and crumbled easily.

Example 7

Ingredients:
1 c. of flour
¼ c. of salt
¼ c. of gluten
4 tab.s. of cream of tartar
2 tab.s. of cornstarch
1 the s. of sodium benzoate
1 c. of water
½ the s. of silicone and
1 the s. of lanoline.

The modelling composition showed a texture that was hard, dried and crumbled easily.

Example 8

Ingredients:
1 c. of flour
¼ c. of salt
¼ c. of gluten
4 tab.s. of cream of tartar
4 tab.s. of cornstarch
¼ the s. of sodium benzoate
1 c. of water
½ the s. of silicone and
1 the s. of lanoline.

The modelling composition showed a texture that was hard, dried and crumbled easily.

Example 9

Ingredients:
1 c. of flour
¼ c. of salt
¼ c. of gluten
2 tab.s. of a thickening agent sold under the trademark HI-SILE
2 tab.s. of cream of tartar
¼ the s. of sodium benzoate
1 c. of water
½ the s. of silicone and
1 the s. of lanoline.

The modelling composition obtained dried-up very rapidly and was hard.

Furthermore, other tests using larger amounts of the thickening agent H1-S1LE give the same results, except the modelling composition was harder.

Example 10

Ingredients:
1 c. of flour
¼ c. of salt
¼ c. of gluten
2 tab.s. of cream of tartar
2 tab.s. of cornstarch
2 tab.s. of calcium chloride
¼ the s. of sodium benzoate
1 c. of water
½ the s. of silicone and
1 the s. of lanoline.

The modelling composition obtained dried-up very rapidly and was hard.

All the recipes made with calcium chloride have given a texture having an aspect that is sticky, rubber-like and dries up rapidly. Furthermore, the modelling composition obtained shows lumps and has an unpleasant odour.

Example 11

Ingredients:
1 c. of flour
¼ c. of salt
¼ c. of gluten
2 tab.s. of a thickening agent sold under the trademark HI-SILE
2 tab.s. of calcium chloride
¼ the s. of sodium benzoate
1 c. of water
½ the s. of silicone and
1 the s. of lanoline.

The modelling composition obtained was thick, sticky, dried up quickly and comprised white lumps and had an unpleasant odour.

Example 12

Ingredients:
1 c. of flour
¼ c. of salt
2 tab.s. of gluten
2 tab.s. of cream of tartar
1 the s. of guar gum
¼ the s. of sodium benzoate
1 c. of water
½ the s. of silicone and
1 the s. of lanoline.

The modelling composition obtained was sticky and dried up quickly. Furthermore, additional recipes have been done with guar gum and they were all of sticky aspect.

Example 13

Ingredients:
1 c. of flour
¼ c. of salt
¼ c. of gluten
2 tab.s. of cream of tartar
2 tab.s. of cornstarch
1 tab.s. of sugar
¼ the s. of sodium benzoate
1 c. of water
½ the s. of silicone and
1 the s. of lanoline.

The modelling composition had a sticky aspect and dried up quickly.

Example 14

Ingredients:
1 c. of flour
¼ c. of salt
¼ c. of gluten
2 tab.s. of cream of tartar
2 tab.s. of cornstarch
½ the s. of amaranth
¼ the s. of sodium benzoate
1 c. of water
½ the s. of silicone and
1 the s. of lanoline.

The modelling composition had non-uniform colours and dried up quickly.

Example 15

Ingredients:
1 c. of flour
¼ c. of salt
¼ c. of gluten
2 tab.s. of cream of tartar
2 tab.s. of cornstarch
2 tab.s. of NYTHAL 300 (trademark)
¼ the s. of sodium benzoate
1 c. of water
½ the s. of silicone and
1 the s. of lanoline.

The modelling composition dried up quickly and had a fluid aspect.

Example 16

Ingredients:
1 c. of flour
¼ c. of salt
¼ c. of gluten
2 tab.s. of cream of tartar
2 tab.s. of cornstarch
1 tab.s. of calcium hycarbonate
¼ the s. of sodium benzoate
1 c. of water
½ the s. of silicone and
1 the s. of lanoline.

The modelling composition was soft, sticky and dried up rapidly. Furthermore, others recipes carried out with various amounts of calcium hycarbonate have given similar results.

Example 17

Ingredients:
1 c. of flour
¼ c. of salt
¼ c. of gluten
2 tab.s. of cream of tartar
2 tab.s. of cornstarch
2 tab.s. of PULPRO H30 (chalk) (trademark)
¼ the s. of sodium benzoate
1 c. of water
½ the s. of silicone and
¼ the s. of lanoline.

The modelling composition obtained was liquid and sticky. Additional tests with different amounts of PULPRO H30 have given the same results.

Example 18

Ingredients:
1 c. of flour
¼ c. of salt
¼ c. of gluten at 30% of gluten and 70% of flour
2 tab.s. of cream of tartar
2 tab.s. of cornstarch
¼ the s. of sodium benzoate
1 c. of water
½ the s. of silicone and
1 the s. of lanoline.

The modelling composition obtained dries up very quickly and crumbles.

Examples 19 to 40 herein after have for object to show the synergistic effect of the use of lanoline with a fluid based agent and three thickening agents of the invention, that is the gluten,, the cream of tartar and the cornstarch.

Example 19

Ingredients:
1 c. of flour

¼ c. of salt
¼ c. of gluten
2 tab.s. of cream of tartar
2 tab.s. of cornstarch
¼ the s. of sodium benzoate
1 c. of water
½ the s. of silicone
1 the s. of lanoline and
1 tab.s. of an oil of the type baby's oil.

The modelling composition dried up very quickly and had an oily aspect.

Example 20

Ingredients:
1 c. of flour
¼ c. of salt
¼ c. of gluten
2 tab.s. of cream of tartar
2 tab.s. of cornstarch
¼ the s. of sodium benzoate
1 c. of water
1 tab.s. of vegetable oil and
1 the s. of silicone.

The modelling composition obtained dried up very quickly and had an oily aspect.

Example 21

Ingredients:
1 c. of flour
¼ c. of salt
¼ c. of gluten
2 tab.s. of cream of tartar
2 tab.s. of cornstarch
¼ the s. of sodium benzoate
1 c. of water and
1 tab.s. of vegetable oil.

The modelling composition dried up very quickly, was oily and crumbled.

Example 22

Ingredients:
1 c. of flour
¼ c. of salt
¼ c. of gluten
2 tab.s. of cream of tartar
2 tab.s. of cornstarch
¼ the s. of sodium benzoate
1 c. of water
1 the s. of silicone and
1 s. of a product sold under the trademark GLUCAM 10.

The modelling composition was sticky and dried up very quickly. Furthermore, no matter what amounts of GLUCAM 10 used, the modelling composition was sticky and dried up rapidly.

Example 23

Ingredients:
1 c. of flour
¼ c. of salt
¼ c. of gluten
2 tab.s. of cream of tartar
2 tab.s. of cornstarch
¼ the s. of sodium benzoate
1 c. of water and
1 the s. of lanoline.

The modelling composition was sticky and dried up rapidly.

Example 24

Ingredients:
1 c. of flour
¼ c. of salt
¼ c. of gluten
2 tab.s. of cream of tartar
2 tab.s. of cornstarch
¼ the s. of sodium benzoate
1 c. of water and
2 tab.s. of propylene glycol.

The modelling composition obtained was a bit sticky and dried.

Example 25

Ingredients:
1 c. of flour
¼ c. of salt
¼ c. of gluten
2 tab.s. of cream of tartar
2 tab.s. of cornstarch
¼ the s. of sodium benzoate
1 c. of water and
1 tab.s. of silicone.

The modelling composition obtained dried up rapidly and crumbled.

Example 26

Ingredients:
1 c. of flour
¼ c. of salt
¼ c. of gluten
2 tab.s. of cream of tartar
2 tab.s. of cornstarch
¼ the s. of sodium benzoate
1 c. of water
1 the s. of silicone and
1 tab.s. of CARBOWAX 400.

The modelling composition obtained dried up rapidly and was sticky.

Example 27

Ingredients:
1 c. of flour
¼ c. of salt
¼ c. of gluten
2 tab.s. of cream of tartar
2 tab.s. of cornstarch
¼ the s. of sodium benzoate
1 c. of water and
1 tab.s. of INDOPOL H35.

The modelling composition obtained dried up rapidly and was sticky.

Example 28

Ingredients:
1 c. of flour
¼ c. of salt
¼ c. of gluten
2 tab.s. of cream of tartar
2 tab.s. of cornstarch
¼ the s. of sodium benzoate 1 c. of water
1 tab.s. of INDOPOL H35 and
1 tab.s. of silicone.

The modelling composition obtained dried up quick and was sticky.

Example 29

Ingredients:
1 c. of flour
¼ c. of salt
¼ c. of gluten
2 tab.s. of cream of tartar
2 tab.s. of cornstarch
¼ the s. of sodium benzoate
1 c. of water
1 tab.s. of INDOPOL H35
1 the s. of silicone and
1 the s of lanoline.

The modelling composition obtained was sticky and dried up rapidly.

Example 30

Ingredients:
1 c. of flour
¼ c. of salt
¼ c. of gluten
2 tab.s. of cream of tartar
2 tab.s. of cornstarch
¼ the s. of sodium benzoate
1 c. of water
1 tab.s. of propylene glycol and
1 the s. of silicone.

The modelling composition obtained was sticky and dried up rapidly.

Example 31

Ingredients:
1 c. of flour
¼ c. of salt
¼ c. of gluten
2 tab.s. of cream of tartar
2 tab.s. of cornstarch
¼ the s. of sodium benzoate
1 c. of water
1 tab.s. of propylene glycol
½ tab.s. of vegetable oil and
½ tab.s. of silicone.

The modelling composition obtained was sticky, oily, dried up rapidly and frosted.

Example 32

Ingredients:
1 c. of flour
¼ c. of salt
¼ c. of gluten
2 tab.s. of cream of tartar
2 tab.s. of cornstarch
¼ the s. of sodium benzoate
1 c. of water
2 tab.s. of aloes vera
1 tab.s. of vegetable oil and
½ the s. of silicone.

The modelling composition obtained was sticky, dried and crumbled.

Example 33

Ingredients:
1 c. of flour
¼ c. of salt
¼ c. of gluten
2 tab.s. of cream of tartar
2 tab.s. of cornstarch
¼ the s. of sodium benzoate
1 c. of water
½ the s. of silicone and
½ tab.s. of propylene glycol.

The modelling composition obtained was sticky, dried up rapidly and crumbled.

Example 34

Ingredients:
1 c. of flour
¼ c. of salt
¼ c. of gluten
2 tab.s. of cream of tartar
2 tab.s. of cornstarch
¼ the s. of sodium benzoate
1 c. of water
½ the.s. of silicone and
½ tab.s. of lanogene.

The modelling composition obtained was sticky, dried and had a bad odor.

Example 35

Ingredients:
1 c. of flour
¼ c. of salt
¼ c. of gluten
2 tab.s. of cream of tartar
2 tab.s. of cornstarch
¼ the s. of sodium benzoate
1 c. of water
1 tab.s. of INDOPOL-14 and
½ the s. of silicone.

The modelling composition obtained was sticky and dried.

Example 36

Ingredients:
1 c. of flour
¼ c. of salt
¼ c. of gluten
2 tab.s. of cream of tartar
2 tab.s. of cornstarch
¼ the s. of sodium benzoate
1 c. of water
1 tab.s. of vegetable oil and
1 tab.s. of ANTI-FOAM SILICONE Y30.

The modelling composition obtained had a bad odour, was dried and was of oily aspect.

Example 37

Ingredients:
1 c. of flour
¼ c. of salt
¼ c. of gluten
2 tab.s. of cream of tartar
2 tab.s. of cornstarch
¼ the s. of sodium benzoate 1 c. of water
½ tab.s. of vegetable oil and
½ tab.s. of silicone.

The modelling composition obtained had a bad odour and dried up rapidly.

Example 38

Ingredients:
1 c. of flour
¼ c. of salt
¼ c. of gluten
2 tab.s. of cream of tartar
2 tab.s. of cornstarch
¼ the s. of sodium benzoate
1 c. of water
½ tab.s. of silicone and
2 the s. of bee wax.

The modelling composition was marbled, hard and dried.

Example 39

Ingredients:
1 c. of flour
¼ c. of salt
¼ c. of gluten
2 tab.s. of cream of tartar
2 tab.s. of cornstarch
¼ the s. of sodium benzoate
1 c. of water
½ the s. of ANTI-FOAM SILICONE 1500 and
1 the s. of lanoline.

The modelling composition obtained was sticky, dried up rapidly and crumbled.

Example 40

Ingredients:
1 c. of flour
¼ c. of salt
¼ c. of gluten
2 tab.s. of cream of tartar
2 tab.s. of cornstarch
¼ the s. of sodium benzoate
1 c. of water
½ the of silicone and
1 tab.s. of SORBITOL.

The modelling composition obtained gave a sticky texture and crystallized while drying up rapidly. Additional recipes made with different amounts of SORBITOL gave the same results.

In conclusion, in the light of the foregoing, it appears that only the particular selection of ingredients making the object of the above identified patent application allows to achieve a modelling composition that is non-toxic, non-sticky, does not dry rapidly, that is of low frosting, does not stain, that is durable and can be handled easily by children and may, if desired, be re-humidified to recover its original characteristics and used again.

Of course, all dry ingredients mentioned hereinbefore are used under powder or granules form to allow their measurement with a cup, a tablespoon or a tea spoon.

What is claimed is:

1. A modelling composition characterized in that it results from the cooking of a mixture comprising:

from ½ to 1¾ cups of grain flour, from ⅓ to ¾ cups of salt and from ½ to 1½ cups of water;

a thickening agent consisting of from 2 tablespoons to ¾ cup of a product (comprising 80% of gluten and 20% of grain flour), from 1 tablespoon to ⅜ cup of cream of tartar and from 1 tablespoon to ⅜ cup of cornstarch, the product, the cream of tartar and the cornstarch being in a volumetric ratio of 2:1:1; the grain flour of the product being in addition to the one previously mentioned;

a food grade anti-mould agent;

from 0.125 to 1 tablespoon of a food grade liquid silicone based anti-sticking agent;

from 0.125 to 2 tablespoons of lanoline as humidifying agent and as thickening agent.

2. A composition according to claim 1, wherein ingredients are gathered in a first and second pre-mixes, the first pre-mix comprising all dry ingredients, the second pre-mix comprising all ingredients not contained in the first pre-mix, both pre-mixes being then joined together to form a mixture intended to be submitted to the cooking.

3. A composition according to claim 2, wherein the liquid silicone based anti-sticking agent is a dimethyl polysiloxane.

4. A composition according to claim 3, wherein the anti-mould agent is sodium benzoate.

5. A composition according to claim 2, wherein the sodium benzoate is used in an amount of about 0.25 teaspoon.

6. A composition according to claim 2, wherein the mixture to be cooked comprises:

1 cup of grain flour, 0.25 cup of salt and 1 cup of water;

a thickening agent comprising 0.25 cup of a product (comprising 80% of gluten and 20% of grain flour), 2 tablespoons of cream of tartar and 2 tablespoons of cornstarch;

0.25 teaspoon of sodium benzoate as anti-mould agent;

0.5 teaspoon of a dimethyl polysiloxane anti-sticking agent;

1 teaspoon of lanoline as humidifying agent and as a thickening agent.

7. A composition according to claim 6, wherein the mixture further contains an usual additive for modelling composition selected from the group consisting of dyes, perfumes and essential oils.

* * * * *